United States Patent Office 2,968,569
Patented Jan. 17, 1961

2,968,569

CHICKEN CONCENTRATE AND METHOD OF MAKING SAME

Murray M. Scharf, Chicago, Ill., assignor to Louis Milani Foods, Inc., Los Angeles, Calif., a corporation of Illinois No Drawing. Filed Aug. 18, 1958, Ser. No. 755,416

9 Claims. (Cl. 99—208)

The present invention relates to chicken bases usable in the making of chicken soup, chicken salad, and other food products and to a process of making the same.

An object of my invention is to provide a process for making chicken concentrates at a cost substantially less than the cost of preparing chicken concentrates by prior methods. Another object of my invention is to provide a chicken concentrate which is not only less costly than chicken concentrates heretofore made, but also has a substantially higher nutrient value and, in many instances, superior flavor.

Prior methods for producing chicken bases involve stripping the chicken meat from the bones either before or after cooking the chicken by an oven roasting process or by the process involving boiling the chicken in water, oils or shortening. Then, the chicken is dried and pulverized by mechanical grinding, after which various ingredient, such as spices, sugar, salt, coloring and monosodium glutamate, are added.

In accordance with my invention, I have discovered that when utilized in the manner described below, chicken bones contribute to the finished product and they are, therefore, not discarded as in prior processes of preparing chicken concentrates. Moreover, I have developed not only a new and useful product but, also, a highly advantageous process for preparing chicken concentrates including both chicken meat and chicken bones, which is exceedingly simple and inexpensive to carry out since, among other reasons, it makes unnecessary the need for stripping the chicken from the chicken bones.

My process involves the treatment of raw eviscerated chicken, which preferably has been cut up into small chunks, with phosphoric acid which disintegrates readily both the chicken meat and the chicken bone, preferably while the mixture of the chicken and the acid is heated and stirred. The process may be carried out in an open vessel so that most of the water content in the chicken, which represents as much as 60% of the weight of the fresh chicken, is evaporated, or in a closed vessel where the water is retained. The latter process is sometimes preferred, particularly where large quantities of chicken are involved, since the presence of water ensures a more intimate contact of the acid with the meat and bone and allows the chicken-acid mixture to be readily stirred. Although stirring is desirable, excellent results can also be achieved without it. The resultant disintegrated chicken product is neutralized in a manner to be explained and then dried using well-known drying methods. Although cooking in an open vessel lacks the above-mentioned advantages, it has the advantage that the chicken is partially dried as it is cooked, and can be essentially completely dried as part and parcel of a subsequent neutralizing step.

It is particularly advantageous to utilize orthophosphoric acid in the practice of my process, particularly the usual 85% orthophosphoric acid of commerce, although other phosphoric acids and the polyphosphoric acids are sufficiently strong to disintegrate the bone as well as the chicekn meat with the utilization of a relatively small quantity of acid, and can be neutralized into an edible, innocuous salt which is substantially tasteless, and also preferably substantially colorless, so that the taste and color of the chicken concentrate is not adversely affected. They also form salts which are water-insoluble and which take up water of crystallization whereby to absorb substantially all of the remaining water left in the cooking process where the chicken is cooked in an open vessel, so that an essentially dry chicken concentrate can readily be formed by neutralizing the product resulting from the phosphoric acid treatment with a base which forms said insoluble salt.

It is particularly desirable to utilize, in addition to the acid, an innocuous water-attracting material, especially sodium chloride, in admixture with the raw eviscerated chicken. The sodium chloride, aids in drawing moisture from deep within the chicken meat and chicken bones, and also enables the acid to make more intimate contact with the chicken. However, in such instances where sodium chloride or other water-attracting agent may not be desirable, for instance, where the chicken concentrate is to be used to make chicken pâté or as a chicken salad base, it can be omitted. However, in such case, longer heating may be necessary and it may be desirable to cut the raw chicken into relatively smaller pieces than would otherwise be done.

The neutralizing agents which give excellent results are the oxides and hydroxides of magnesium and calcium, with magnesium oxide or hydroxide being preferred. Neutralization of phosphoric acid with these materials produces magnesium and calcium phosphates which are insoluble, take up water of crystallization and do not adversely affect the flavor or color of the chicken concentrate. However, where only a partially dehydrated concentrate is desired or where the obtainment of a dry product by separate drying procedures is required or desired, as where the cooking process is carried out in a closed vessel, the neutralizing agent may comprise sodium, potassium or ammonium hydroxide, although magnesium oxide or hydroxide is decidedly preferred. Sodium, potassium and ammonium phosphates are soluble, edible salts which do not adversely affect the flavor or color of the chicken concentrate.

The total usage of practically all of the chicken bones makes a chicken concentrate which is often superior to and invariably cheaper than those produced by prior methods which involve the discarding of the chicken bones. The simplicity of my method of disintegrating the chicken meat and bone also contributes to the low cost of my chicken product.

A specific example of one method of preparing chicken concentrates using my invention will now be described. While the proportions and nature of the constituent ingredients used in the process are variable, good results have been obtained when cooking the following ingredients in substantially the stated proportions by weight:

84 parts clean eviscerated chicken, preferably cut up or chopped into small chunks,
45 parts table salt (sodium chloride distributed throughout the chicken pieces,
6 parts of 85% orthophosphoric acid.

This mixture is cooked in a steam jacketed kettle open at the top for about three hours. Initially, the cooking of the chicken mixture results in the formation of a liquor which the salt sucks from the meat and bones. Then, as the cooking proceeds, evaporation of water and disintegration of the chicken flesh and bones takes place. At the end of the three hour period, none of the bones is visible and a semi-solid mass containing the acid-disintegrated chicken meat and bones remains. Calculating the chicken to have a 60% water content, approximately 50 parts by weight of water is evaporated during the three hour period, leaving about 16 parts of water.

The next step in the process is the addition of approximately three parts by weight of magnesium oxide which neutralizes the phosphoric acid remaining in the cooked mixture into an insoluble salt which absorbs the 16 parts of remaining water to form a dry pulverulent chicken concentrate. The fineness of the resultant product is such that it can at least pass through a U.S. Standard No. 20 sieve. The neutralization process produces magnesium phosphate with water of crystallization, the chemical formula being:

$$Mg_3(PO_4)_2 \cdot 4H_2O$$

Where my process is carried out in a closed vessel, the same procedure outlined above may be carried out, except that the mixture resulting from the neutralizing step is dried using any one of a number of well known drying processes.

As stated above, variations in the specific proportions of the ingredients used in my process may be made without deviating from the broader aspects of the present invention. However, for best results, a certain minimum quantity of phosphoric acid is necessary to disintegrate all of the chicken bones. Thus, where 85% orthophosphoric acid is used, the phosphoric acid should be used in amounts equal at least to about 4.5% to 5% by weight of the chicken-chicken bone product, and most desirably from 7% to 10% by weight thereof. Also, where sodium chloride is used, it should preferably comprise from 5% to 60% by weight of the chicken-chiken bone product. The amount of base used is preferably just sufficient to neutralize the phosphoric acid.

The dried chicken concentrate may be mixed with various materials in various proportions to form the desired chicken base. For example, in the case where the concentrate is to be used in a chicken soup base, the following formulation with proportions by weight may be used:

25 parts chicken concenerate
3 parts monosodium glutamate
1.5 parts onion powder
10 parts cornstarch
5 parts spice mixture
25.5 parts salt
30 parts dextrose The chicken concentrate of my invention has an excellent flavor and, additionally, is rich in mineral content due to the presence of the chicken bone. The phosphate salt resulting from the neutralizing step is retained in the chicken concentrate and is a desirable addition to the chicken concentrate, particularly where the phosphate is an insoluble magnesium or calcium phosphate containing water of crystallization. The chicken concentrates of my invention comprise, when dried in a form to produce pulverulent, relatively free flowing products, mixtures of disintegrated chicken meat and chicken bone, in which the chicken meat has preferably been at least partially cooked, in admixture with an innocuous phosphoric acid salt resulting from the neutralization of the phosphoric acid, or with supplemental ingredients such as sodium chloride. In general, the mixture of disintegrated chicken meat and chicken bones will be present in substantial and usually major proportions and the other ingredients each in minor proportion based on the weight of the dry pulverulent chicken concentrate.

What I claim as new and desire to protect by Letters Patent of the United States is:

1. A process of making chicken concentrate comprising contacting chicken on the bone with a phosphoric acid in amounts equal to at least about 5% by weight of the raw chicken to disintegrate essentially completely the chicken meat and bone, and then neutralizing the phosphoric acid with a base which forms therewith an edible phosphate.

2. A process of making chicken concentrate comprising cutting up chicken on the bone into chunks, then contacting the chunks of chicken with a phosphoric acid in amounts equal to from about 5 to 10% by weight of the raw chicken to disintegrate essentially completely the chicken meat and bone, and then neutralizing the phosphoric acid with at least one member of the group consisting of oxides and hydroxides of magnesium and calcium, and the hydroxides of sodium, potassium and ammonium, to form an edible phosphate.

3. A process of making chicken concentrate comprising cutting up raw eviscerated chicken on the bone into chunks, admixing sodium chloride therewith in amount equal to about 5 to 60% of the weight of the raw chicken, heating the resulting mixture with from about 5 to 10%, by weight of said chicken, of 85% orthophosphoric acid to cook the chicken while the acid disintegrates essentially completely the chicken meat and bone, and then neutralizing the resultant mixture with magnesium oxide.

4. A process of making chicken concentrate comprising cooking raw chicken and chicken bone with from five percent to ten percent of its weight of orthophosphoric acid until the bone is disintegrated, and then neutralizing the acid remaining in the mixture with an edible magnesium-containing base.

5. A process of making chicken concentrate comprising subdividing chicken and chicken bone, dispersing sodium chloride therethrough in amount from 5% to 60% of the weight of the chicken material, heating the mixture with from 5% to 10% of its weight of phosphoric acid to disintegrate the chicken meat and bone, and neutralizing the acid remaining in the mixture with an edible base.

6. A process of making chicken concentrate comprising subdividing raw eviscerated chicken on the bone into chunks, heating said chunks with 5% to 10% phosphoric acid to cook, partially dehydrate, and disintegrate both the chicken meat and the chicken bone, and then neutralizing the resultant mixture with a base which forms an edible phosphate from said phosphoric acid, which edible phosphate binds as water of crystallization the free water in said chicken concentrate.

7. A process of making chicken concentrate comprising subdividing chicken on the bone into chunks, cooking said chunks under pressure with 5% to 10% phosphoric acid to disintegrate the chicken meat and bone, neutralizing the resultant mixture with a base which forms an edible phosphate therefrom, and drying the neutralized mixture.

8. A dry chicken product as produced by the process of claim 7.

9. A dry chicken concentrate as produced by the process of claim 6.

References Cited in the file of this patent

UNITED STATES PATENTS

| | | |
|---|---|---|
| 1,398,464 | MacLachlan | Nov. 29, 1921 |
| 2,622,028 | Torr | Dec. 16, 1952 |

FOREIGN PATENTS

| | | |
|---|---|---|
| 550,421 | Great Britain | Jan. 7, 1943 |